Feb. 27, 1968

L. F. BIRD ETAL  3,371,262
PROTECTION CIRCUITS FOR TRANSISTORIZED
REGULATOR CIRCUITRY

Filed Dec. 22, 1965

Lester F. Bird
Carl W. Green,
INVENTORS.

Harry M. Saragovitz
BY Edward J. Kelly
Herbert Berl
Alfred E. Smith

Lester F. Bird
Carl W. Green,
INVENTORS.

3,371,262
PROTECTION CIRCUITS FOR TRANSISTORIZED
REGULATOR CIRCUITRY
Lester F. Bird, Baltimore, Md., and Carl W. Green, Emmaus, Pa., assignors, by mesne assignments, to the United States of America as represented by the Secretary of the Army
Filed Dec. 22, 1965, Ser. No. 515,785
11 Claims. (Cl. 321—11)

The invention described herein may be manufactured and used by or for the Government for governmental purposes without the payment of any royalty thereon.

This invention relates to protective circuits for voltage and current regulators in regulated power supplies and particularly to protection circuits employing transistorized and controlled rectifier circuitry.

A major problem encountered in the design of regulated power supplies is protection of transistor regulator circuitry operating under abnormal conditions. This protection problem is particularly serious when a severe overload, such as a short, is applied at the regulator output terminals.

Existing regulators use series power transistors to control the output voltage. When the output terminals are short circuited these series transistors may be damaged either by excessive emitter-collector voltage or by excessive power dissipation. Although each power supply has an input circuit breaker, circuit breaker operation is too slow to protect the series transistors when extreme overloads are applied.

Dangerous conditions other than short circuits might exist for which protection should be provided. For instance, over-voltage or under-voltage at the output terminals indicates a trouble condition which might be harmful to circuits using the regulator voltage.

Accordingly, it is an object of this invention to provide protection for a regulating transistor against damage by the use of a controlled rectifier in a shunt path.

Another object of this invention is to provide an improved low voltage regulator protection circuit.

A further object of this invention is to provide an improved high voltage regulator protection circuit.

A still further object of this invention is to provide a means for protecting a regulator against overload and short circuit currents.

These and other objects and features of the present invention will become apparent when considered in light of the following specifications and drawings wherein.

Figure 1:
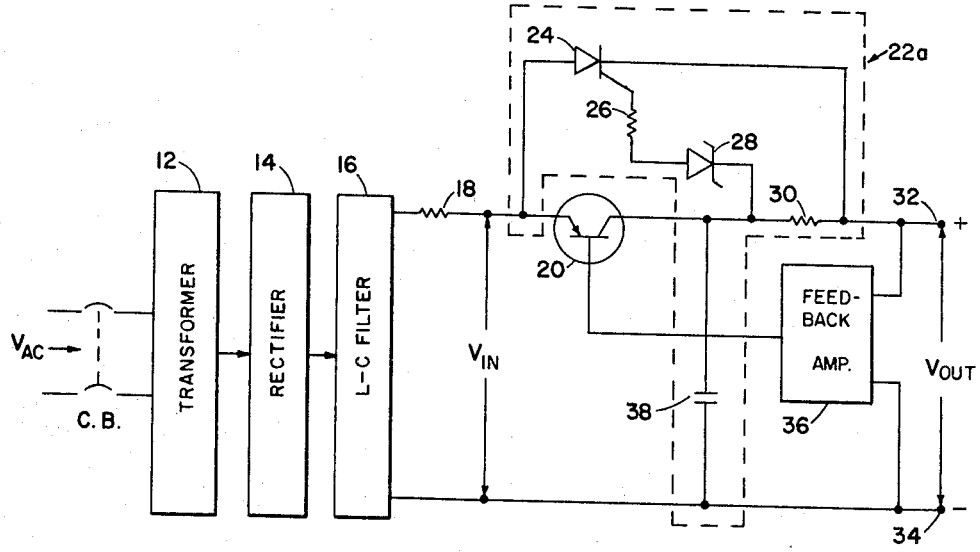
FIGURE 1 is a schematic illustration of a first embodiment of a short circuit protection circuit according to the present invention.

Referring now to FIGURE 1, transistor 20 operates as a series voltage regulator between the network of transformer 12, rectifier 14 and L-C filter 16 and output terminals 32 and 34. Transistor 20 is controlled by feedback amplifier 36 connected across the output terminals 32 and 34.

Protection circuit 22a includes controlled rectifier 24 connected in shunt with regulating transistor 20. Zener diode 28 and resistor 26 are connected in series with the gate-cathode of controlled rectifier 24. This series combination is in parallel with resistor 30.

In the operation of the protective circuit controlled rectifier 24 is properly biased for non-conduction under normal operating conditions. When sufficient current flows in the gate-cathode junction, controlled rectifier 24 will fire thus providing a low impedance path shunting transistor 20. If the output terminals 32 and 34 are short circuited, the voltage across capacitor 38 appears across resistor 30 and thus across the combination of zener diode 28, resistor 26, and the gate-cathode of controlled rectifier 24. The minimum voltage across resistor 30 necessary to insure firing of controlled rectifier 24 is:

$$V_{30\ min.} = V_{28} + V_{G\ max.} + I_{G\ max.} R_{26}$$

where:

$V_{28}$ = zener breakdown voltage of zener diode
$V_{G\ max.}$ = maximum specified gate voltage required to fire the controlled rectifier
$I_{G\ max.}$ = maximum specified gate current required to fire the controlled rectifier
$R_{26}$ = resistance of resistor 26.

Satisfactory operation requires that the voltage across resistor 30 remain greater than $V_{30\ min.}$ for at least the firing time of controlled rectifier 24, and that the emitter-collector voltage of transistor 20 be less than the maximum rated voltage until the controlled rectifier has fired. These requirements are defined by the following equations:

$$V_{38}(e^{-\tau/RC}) > V_{30\ min.}$$
$$V_{in} - V_{38}(e^{-\tau/RC}) < V_{ce\ max.}(T20)$$

where $R \approx$ resistance 30 if resistance 30 << resistance 26.

Resistor 26 limits the controlled rectifier gate current during discharge of capacitor 38. Resistor 18 limits the anode-cathode current in the controlled rectifier after firing.

Figure 2:
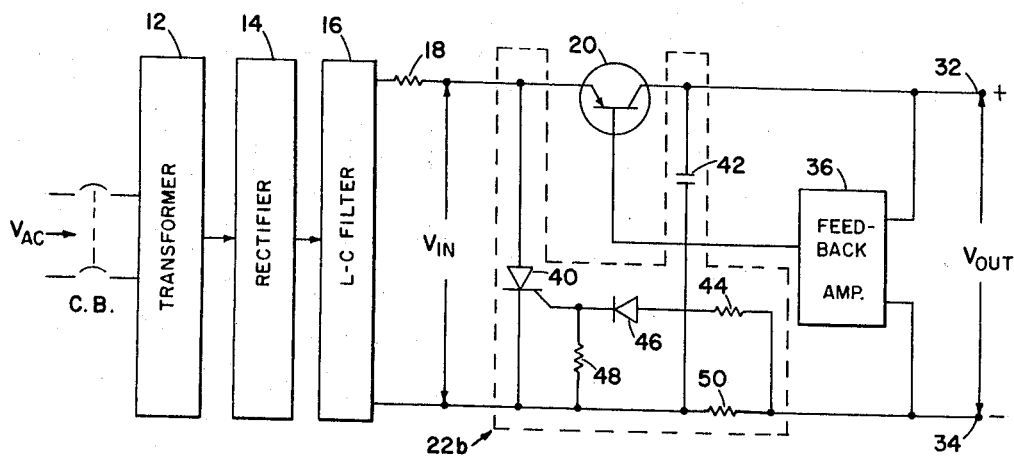
FIGURE 2 is a schematic illustration of a second embodiment of a short circuit protection circuit according to the present invention.

The embodiment illustrated in FIGURE 2 is similar to that shown in FIGURE 1 except that it utilizes a different protection circuit.

Protection circuit 22b includes controlled rectifier 40 sunted across the input to the transistor regulator. Resistor 44 and forward biased diode 46 are connected in series with the gate-cathode of the controlled rectifier. This series combination is in parallel with resistor 50. Resistor 48 shunts the gate and cathode of the controlled rectifier.

In the operation of the protective circuit of FIGURE 2, controlled rectifier 40 is properly biased for non-conduction under normal operating conditions. When sufficient current flows in the gate-cathode junction, the controlled rectifier will fire thus providing a low impedance path and effectively shorting the regulator input. If the output terminals 32 and 34 are short circuited, the voltage across capacitor 42 appears across resistor 50 and thus across the combination of resistor 44, diode 46 and gate-cathode junction of the controlled rectifier. Resistor 48 which has been conducting almost all of the current cannot handle the large surge, thus the gate-cathode junction conducts a sufficient amount of current to fire the controlled rectifier. The minimum voltage across resistor 50 necessary to insure firing of the controlled rectifier is:

$$V_{50\ min.} = V_{G\ max.} + V_{46} + R_{44}\left[I_{G\ max.} + \frac{V_{G\ max.}}{R_{48}}\right]$$

Since the input voltage to this particular regulator is less than the rated emitter-collector voltage of the series transistors, the condition necessary for operation of the protection circuit is:

$$V_{42}(e^{-\tau/RC}) > V_{50\ min.}$$

where $R \approx$ resistance 50 if resistance 44 >> resistance 50.

Resistor 44 limits the controlled rectifier gate current during discharge of the capacitor. Resistor 18 limits the anode-cathode current in the controlled rectifier after firing.

Figure 3:
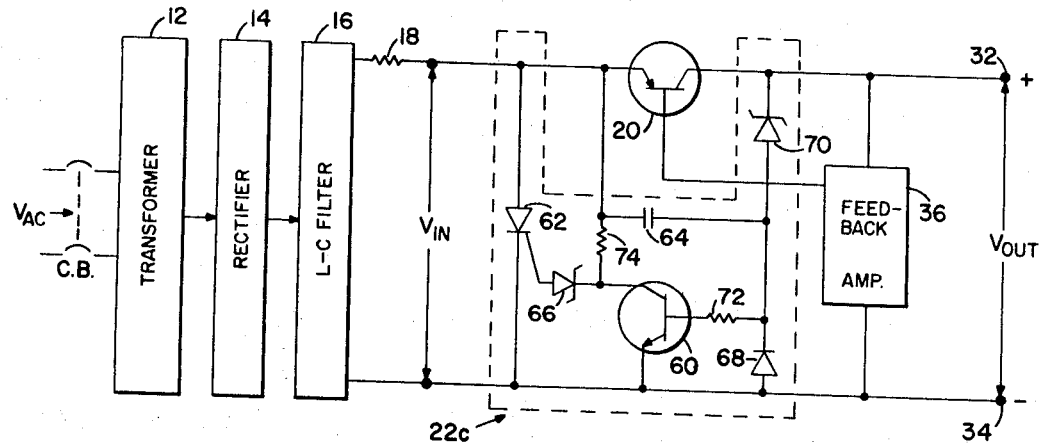
FIGURE 3 is a schematic illustration of a third embodiment of a short circuit and low voltage protection circuit according to the present invention.

In FIGURE 3, protection circuit 22c includes controlled rectifier 62 shunted across the input to the transistor regulator. Zener diode 70 has a cathode connected to the collector of transistor 20 and an anode connected to the base of transistor 60 through resistor 72. A second zener diode 66 has a cathode connected to the collector of transistor 60 and to the emitter of transistor 20 through resistor 74 and an anode connected to the gate of controlled rectifier 62. The emitter of transistor 60 is connected to output terminal 34. Diode 68 has a cathode connected to one side of resistor 72 and an anode connected to output terminal 34. Capacitor 64 is connected between the emitter of transistor 20 and one side of resistor 72.

In the operation of the protective circuit of FIGURE 3, controlled rectifier 62 is properly biased for non-conduction under normal operation. When sufficient current flows in the gate-cathode junction, the controlled rectifier will fire thus providing a low impedance path and effectively shorting the regulator input. During the turn-on period capacitor 64 charges through resistor 72 to saturate transistor 60 causing conduction and thus disabling the protection circuit, enabling the output voltage to rise to its operating magnitude. If there is short circuit between output terminals 32 and 34 or if the voltage drops below rated 24 volts of zener diode 70 there is no current flow through resistor 72 and transistor 60 is effectively open and the gate current in the controlled rectifier becomes:

$$I_G = \frac{V_{in} - V_{66} - V_G}{R_{74}}$$

where:

$V_G$ = gate-cathode voltage of the controlled rectifier
$I_G$ = gate current in controlled rectifier
$V_{66}$ = voltage across element 66

Zener diode 66 starts conducting with a buildup of positive voltage on its cathode due to transistor 60 being open circuited. The current flows from gate to cathode thus firing the controlled rectifier. Diode 68 provides a discharge path for capacitor 64 after firing. Resistor 18 limits the forward current in the controlled rectifier.

Figure 4:
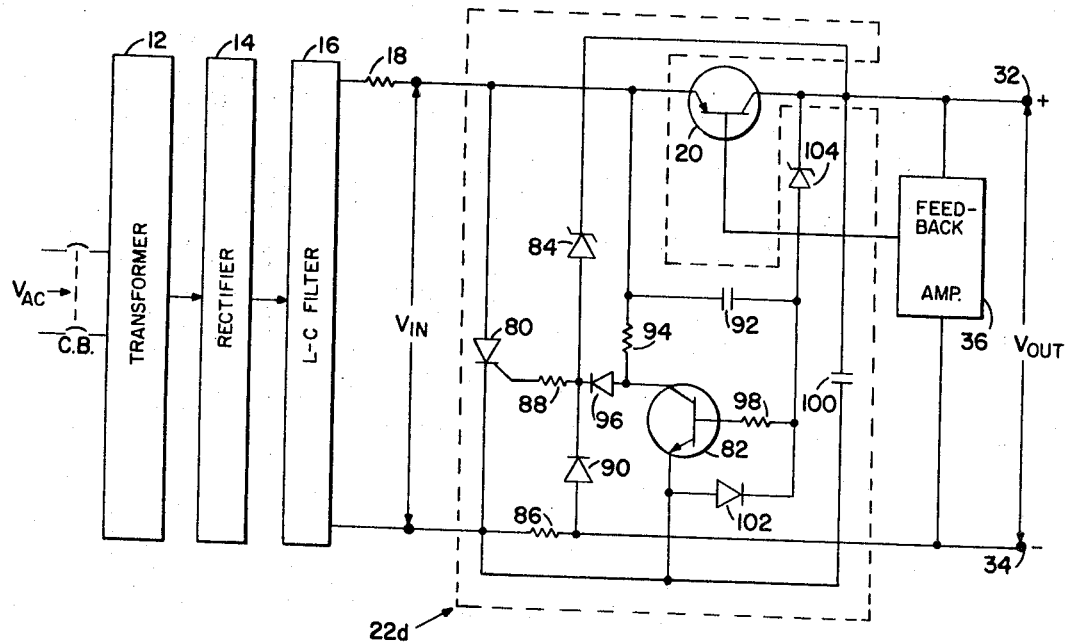
FIGURE 4 is a schematic illustration of a comprehensive protection circuit according to the present invention.

The comprehensive protection circuit 22d in FIGURE 4, includes controlled rectifier 80 shunted across the input to the transistor regulator. Zener diode 84 with a cathode is connected to output terminal 32 and an anode is connected to gate junction of controlled rectifier 80 through resistor 88. Connected to the anode of zener diode 84 are the cathodes of two diodes 90 and 96. The anode of diode 90 is connecte to output terminal 34 and to the cathode of controlled rectifier 80 through resistor 86. The anode of diode 96 is connected to both the collector of transistor 82 and emitter of the regulating transistor through resistor 94. A second zener diode 104 with a cathode is connected to output terminal 32 and anode connected to the base of transistor 82 through resistor 98. Capacitor 92 is connected between the anode of zener diode 104 and the emitter of the regulating transistor. A second capacitor 100 is connected between output terminal 32 and cathode of the controlled rectifier. Diode 102 has an anode connected to emitter of transistor 82 and a cathode connected to the base of the transistor through resistor 98.

In the operation of the protective circuit of FIGURE 4, controlled rectifier 80 is properly biased for non-conduction under normal operation. When sufficient current flows in the gate-cathode junction, the controlled rectifier will fire thus providing a low impedance path and effectively shorting the regulator input. During the turn-on period capacitor 92 charges through resistor 98 to saturate transistor 82 causing conduction and thus disabling the protection circuit, enabling the output voltage to rise to its operating magnitude. Low voltage and short circuit voltage protection is provided by the following elements: transistor 82, zener diode 104, diode 96, resistors 88, 94 and 98 and controlled rectifier 80. Operation of the elements for protection occurs when the output voltage falls below the zener breakdown voltage of zener diode 104. When this occurs, no current flows through resistor 98 and transistor 82 is effectively open and the gate current will start flowing through diode 96 and resistor 88. Three conditions are necessary for satisfactory operation. One, the base current supplied to transistor 82 must be capable of saturating the transistor for normal output voltage:

$$\frac{V_{in} - V_{sat}(T82)}{R_{94}} < \left[\frac{V_{out} - V_{104} - V_{be}(T82)}{R_{98}}\right] B_{t82}$$

where $B_{t82}$ = common-emitter current gain of transistor 82. Two, the gate current must be sufficient to fire the controlled rectifier when $V_{out} < V_{104}$, $$I_{g\ max.} < \left[\frac{V_{in} - V_{96} - V_{g\ max.}}{R_{94} + R_{88}}\right]$$

Three, the saturation voltage of transistor 82 with collector current of $V_{in}/R_{94}$ must be small enough to prevent firing of the controlled rectifier, $$V_{sat}(T82) < [V_{96} + V_{g\ min.} + I_{g\ min.} R_{88}]$$

Diode 102 provides a discharge path for capacitor 92 after firing.

High output voltage protection is provided by zener diode 84, resistor 88 and controlled rectifier 80. The condition necessary for operation is:

$$V_{out} > [V_{84} + I_{g\ max.} R_{88} + V_{g\ max.} - I_L R_{86}]$$

where $I_L$ = load current through output terminals 32 and 34. Rectifier diodes 90 and 96 isolate the overvoltage section from the remainder of the protection circuit.

Overload current protection is obtained by the circuit composed of resistor 86, diode 90, resistor 88, and controlled rectifier 80. The load current required to fire the controlled rectifier will fall somewhere within the following limits:

$$\text{Min. } I_L \text{ to fire controlled rectifier} = \frac{I_{g\ min.} R_{88} + V_{g\ min.} + V_{90}}{R}$$

$$\text{Max. } I_L \text{ to fire controlled rectifier} = \frac{I_{g\ max.} R_{88} + V_{g\ max.} + V_{90}}{R}$$

where $R \approx$ resistance 86 if resistance $86 <<$ resistance 88. The load current required to fire the controlled rectifier can thus be adjusted by varying resistor 86.

Protection against excessive $V_{ce}$ for transistor 20 is obtained with capacitor 100 and resistor 86. When output terminals 32 and 34 are short circuited, capacitor 100 discharges through resistor 86 in parallel with diode 90, resistor 88 and the gate-cathode junction of the controlled rectifier. Requirements for satisfactory operation is that the gate current must be greater than $I_{g\ max.}$ during the firing time of the controlled rectifier, $$V_c(e^{-\tau/RC}) > [V_{g\ max.} + V_{90} + I_{g\ max.} R_{88}]$$

and the voltage across transistor 20 must not exceed the rated $V_{ce}$ during the firing time of the controlled rectifier, $$V_{in} - V_c(e^{-\tau/RC}) < V_{ce\ max.}(T20)$$

where:

$C$ = capacitor 100

$R \approx R_{86}$ if $R_{86} << R_{88}$

While the invention has been described with reference to the preferred embodiments thereof, it will be apparent that various modifications and other embodiments thereof will occur to those skilled in the art within the scope of the invention. For instance, resistors may be substituted for diodes 68 and 102. Accordingly, I desire the scope of my invention to be limited only by the appended claims.

We claim:
1. A regulating power supply comprising: an alternating current input source; a transformer connected to said input source; a rectifier connected to said transformer; a filter network having an input connected to said rectifier and having first and second output terminals; an output circuit having first and second terminals; a regulating transistor having an emitter connected to said first filter output terminal and a collector connected to said first output terminal; a controlled rectifier including a cathode, an anode and a gate; said cathode being connected to said second rectifier output terminal and said anode connected to said emitter; a resistor connected to said filter cathode and to said second output terminal; a capacitor connected between said filter cathode and said collector; and a diode having a cathode connected to said gate and an anode connected to said second output terminal; and a means for firing said control rectifier when said output terminals are short circuited.

2. A regulating power supply as set forth in claim 1, wherein said means is connected between said transistor emitter and said second output terminal.

3. A regulating power supply as set forth in claim 2, wherein said means comprises: a resistor and a forward biased diode connected in series between said second output terminal and said gate electrode of said control rectifier.

4. A regulating power supply comprising: an alternating current input source; a transformer connected to said input source; a rectifier connected to said transformer; a filter network having an input connected to said rectifier and having first and second output terminals; an output circuit having first and second terminals; a regulating transistor having an emitter connected to said first filter output terminal and a collector connected to said first output terminal, and a base connected to a feedback amplifier connected across a load; a controlled rectifier including a cathode, an anode and a gate; said cathode being connected to said second filter output terminal and said second output terminal, and said anode connected to said emitter; a second transistor having an emitter connected to said second output terminal, a collector connected to said emitter of said regulating transistor, and a base connected to a cathode of a diode with said diode anode connected to said second output terminal; a capacitor connected between said second transistor collector and base; a zener diode having a cathode connected to said regulating transistor collector and an anode connected to said second transistor base; a second zener diode having a cathode connected to said second transistor collector and an anode connected to the gate of said control rectifier; and a means for firing said rectifier when said output terminals are short circuited.

5. A regulating power supply as set forth in claim 4, further comprising a means for firing said controlled rectifier when the voltage across said first and second output terminals drops below a predetermined level.

6. A regulating power supply as set forth in claim 5, wherein said means comprises a second zener diode with a cathode connected to said first output terminal.

7. A regulating power supply as set forth in claim 5, wherein said means comprises a second zener diode with a cathode connected to said first output terminal, and with an anode connected to a cathode of said diode and the base of said second transistor, with the anode of said diode connected to said second output terminal, with the emitter of said second transistor connected to said second output terminal, and collector of said second transistor connected to the cathode of said second zener diode and the anode of said second zener diode connected to the gate of said controlled rectifier.

8. A regulating power supply comprising: an alternating current input source; a transformer connected to said input source; a rectifier connected to said transformer; a filter network having an input connected to said rectifier and having first and second output terminals; an output circuit having first and second terminals; a regulating transistor having an emitter connected to said first rectifier output terminal and a collector connected to said first output terminal, and a base connected to a feedback amplifier connected across said output terminals; a controlled rectifier including a cathode, an anode and a gate, said cathode being connected to said second rectifier output terminal, and said anode connected to said emitter; a resistor connected to said rectifier cathode and to said second output terminal; a second transistor having an emitter connected to said rectifier cathode, a collector connected to said emitter of said regulating transistor, and a base connected to a cathode of a diode with said diode anode connected to said rectifier cathode; a capacitor connected between said second transistor collector and base; a zener diode having a cathode connected to said regulating transistor collector and an anode connected to said second transistor base, a second zener diode having a cathode connected to said regulating transistor collector and an anode connected to said gate of the controlled rectifier; a second diode having a cathode connected to said gate of the control rectifier and an anode connected to said second transistor collector; a third diode cathode connected to the gate of said control rectifier and an anode connected to second output terminal; a capacitor having two terminals, a first of said terminals connected to said regulating transistor collector and a second of said terminals connected to said second transistor emitter and to said control rectifier cathode; and means for firing controlled rectifier under any abnormal conditions from those preset in the circuit.

9. A regulating power supply as set forth in claim 8, wherein said means comprises: a zener diode means for protecting said regulating transistor against damage from high output terminal voltage.

10. A regulating power supply as set forth in claim 8, wherein said means comprises: a zener diode means for firing said controlled rectifier when the voltage across said first and second output terminals drops below a predetermined level.

11. A regulating power supply as set forth in claim 8, wherein said means comprises: a forward biased diode and a resistor connected in series between said second output terminal and the gate electrode of said control rectifier.

References Cited
UNITED STATES PATENTS 2,925,548 2/1960 Scherer _____ 323—22
2,967,991 1/1961 Devitch _____ 323—22
3,049,642 8/1962 Quinn.

OTHER REFERENCES

IBM Technical Disclosure Bulletin, "Voltage Regulator With Fuseless High-Speed Shut Off," pp. 11, 12, vol. 6, No. 12, May 1964.

JOHN F. COUCH, *Primary Examiner.*

W. H. BEHA, *Assistant Examiner.*